US005557714A

United States Patent [19]
Lines et al.

[11] Patent Number: 5,557,714
[45] Date of Patent: Sep. 17, 1996

[54] METHOD AND SYSTEM FOR ROTATING A THREE-DIMENSIONAL MODEL ABOUT TWO ORTHOGONAL AXES

[75] Inventors: Andrew Lines, Los Angeles, Calif.; Matthew C. Bamberger, Bellevue; Brian H. Yamasaki, Redmond, both of Wash.

[73] Assignee: Microsoft Corporation, Redmond, Wash.

[21] Appl. No.: 10,824

[22] Filed: Jan. 29, 1993

[51] Int. Cl.$^6$ ..................................................... G06F 15/00
[52] U.S. Cl. ......................................................... 395/137
[58] Field of Search ..................................... 395/127, 124, 395/129, 127, 137; 345/201, 139; 340/815.42

[56] References Cited

U.S. PATENT DOCUMENTS

| | | | |
|---|---|---|---|
| 4,685,070 | 8/1987 | Flinchbaugh | 395/124 |
| 4,734,690 | 3/1988 | Waller | 395/127 |
| 4,754,269 | 6/1988 | Kishi et al. | 395/127 |
| 5,003,498 | 3/1991 | Ota et al. | 395/127 |
| 5,019,809 | 5/1991 | Chen | 340/815.31 |
| 5,276,785 | 1/1994 | Mackinlay et al. | 395/127 |
| 5,303,337 | 4/1994 | Ishida | 395/127 |

OTHER PUBLICATIONS

Swivel 3D Professional 3D User's Guide, Paracomp, Inc., 1987–1990, San Francisco, California, U.S., pp. 3–1, 3–9; 4–1, 4–16; 5–8, 5–11; 14–1, 14–5.

Chen et al.; *A Study in Interactive 3–D Rotation Using 2–D Control Devices*; Aug. 1988; pp. 121–129.

*The Showplace Companion*; Pixar, 1990; pp. 16–18, 27–28, 30, 70–73, 96–97, 101–105, 110–114, 230.

Foley et al.; *Computer Graphics: Priciples and Practice*; 1990; pp. 203–209, 213–226, 376–381, 386–388.

MacDraw® Pro User's Guide; Claris Corporation; 1991; pp. 3-20-3-22, 3-47-3-50.

INFINI-D User's Manual; Specular International, Ltd.; 1991–1992; pp. 20–24, 39, 74–76, 165.

Jeff Hultquist, "A Virtual Trackball," *Graphic Gems*, 1990, pp. 462–463.

Ken Shoemake, "ARCBALL: A User Interface for Specifying Three–Dimensional Orientation Using a Mouse," *Graphics Interface*, 1992, pp. 151–156.

*Primary Examiner*—Phu K. Nguyen
*Attorney, Agent, or Firm*—Seed & Berry LLP

[57] ABSTRACT

The method and computer system rotate a three-dimensional model about the x-axis and y-axis on a computer display device in response to user input generated by a pointer positioning device. No rotation about the z-axis is permitted, and rotation about the x-axis is limited to ±90 degrees. The computer system includes the display device, a user controllable pointer positioning device, and a corresponding pointer, which is displayed on the display device. The computer system rotates the model in a fluid manner, providing kinesthetic correspondence between the movement of the pointer positioning device and the model. Additionally, the computer system provides reversibility of rotation so that a user can easily return the model to a previous rotational view.

21 Claims, 7 Drawing Sheets

METHOD AND SYSTEM FOR ROTATING A THREE-DIMENSIONAL MODEL ABOUT TWO ORTHOGONAL AXES

TECHNICAL FIELD

This invention relates to a method and system for rotating a three-dimensional model about two orthogonal axes.

BACKGROUND OF THE INVENTION

A three-dimensional model is a computer simulation of a physical object. The computer system rotates the model so that it can be viewed from different angles by a user of the computer system. Rotation is typically accomplished by sequential rotations about three mutually perpendicular axes. Types of rotations include: tilt, which is rotation about the z-axis; rotation, which is rotation about the y-axis; and elevation, which is rotation about the x-axis.

On a computer system display device, the axes are commonly setup in such a way that the x-axis is horizontal, extending from the left of the display device to the right; the y-axis is vertical, extending from the bottom of the display device to the top, and the z-axis is horizontal, extending from the rear of the display device to the front. This axis orientation is known as a right-handed coordinate system.

Various techniques have been developed for rotating three-dimensional models using two-dimensional pointer positioning devices such as a mouse. Some of these techniques attempt to provide kinesthetic correspondence between the movement of the pointer positioning device and the direction of the model's movement. That is, the movement of the pointer positioning device is supposed to provide the user with the sense of actually rotating the displayed model. Kinesthetic correspondence between the pointer positioning device and the model's movement is a highly desired feature.

Rotation routines are typically used in computer-aided design (CAD) systems, to view a three-dimensional model from many different angles. These routines allow three full degrees of rotational freedom. Simple rotation routines involve entering values used for rotation, elevation, and tilt directly. More advanced routines attempt to model the behavior of a mathematical sphere centered around the model, the sphere being spun around its center by a user dragging the surface of the sphere with a pointer positioning device.

A common problem of the rotation routines used in CAD systems is that it is difficult for a user to return the model to the starting position after beginning to rotate the model. This concept is known as reversibility and it is also a highly desired feature. Another common problem is that small movements of the pointer positioning device by the user can cause abrupt changes in the display of the model.

Rotating a three-dimensional model displayed in perspective view is more challenging than rotating a three-dimensional model displayed in isometric view. Perspective view is a display method that shows models in three dimensions with the depth aspect rendered according to the desired perspective. A computer system that displays a cube in perspective view, for example, shows the sides in relation to one another but shows the height as growing smaller with distance. An advantage of perspective view is that it presents a more accurate representation of what the human eye perceives.

Isometric view, on the other hand, is a display method that shows three-dimensional models with height and width, but without the change in perspective that would be added by depth. A computer system that displays a cube in isometric view, for example, shows the sides in relation to one another, each side evenly proportioned with height and width, but no depth; the sides thus do not appear to grow smaller with distance as they do when the cube is drawn in perspective.

SUMMARY OF THE INVENTION

The present invention provides a method and computer system for rotating a three-dimensional model about two orthogonal axes. The model is displayed on a display device of the computer system. In a preferred embodiment, the model is rotated about the x-axis and y-axis in response to user input with a pointer positioning device. No rotation about the z-axis is permitted, and rotation about the x-axis is limited to ±90 degrees. In a preferred embodiment, the computer system includes the display device, a user controllable pointer positioning device with signal generating means, and a corresponding pointer, which is displayed on the display device. A rotation routine operates on the computer system to control rotation of the model.

To begin rotation of the model, the user moves the pointer positioning device to position the pointer over a selected reference point on the model. The user then actuates the signal generating means on the pointer positioning device to generate a first signal. In response to the generation of the first signal, the rotation routine begins the rotation process, waiting for input from the user as to how the model should be rotated. While continuing to actuate the signal generating means, the user moves the pointer positioning device to reposition the pointer. The rotation routine rotates the model about the y-axis and then the x-axis so that the reference point remains under or close to the pointer. The user then deactuates the signal generating means on the pointer positioning device to generate a second signal. In response to the generation of the second signal, the rotation routine ceases rotation of the model.

The reference point and pointer are on the surface of a mathematical sphere centered on the center of the model. Because zero tilt and only certain degrees of elevation are allowed, for any reference point there are unreachable regions on the sphere to which the reference point may not be rotated. The rotation routine attempts to determine a rotation about the y-axis, followed by an elevation about the x-axis that will rotate the reference point to the pointer's position.

If the pointer is in an unreachable region of the mathematical sphere, the rotation routine uses tracking routines to track the reference point to the pointer movement, keeping the reference point along the edge of the unreachable region.

The rotation routine rotates the model in a fluid manner without any abrupt changes in view, providing kinesthetic correspondence between the movement of the pointer positioning device and the model. The rotation routine also provides reversibility of rotation so that a user can easily return the model to a previous rotational view.

DETAILED DESCRIPTION OF THE INVENTION

The present invention provides a method and computer system for rotating the display of a three-dimensional model in response to user manipulation of a pointer positioning device. A rotation routine provided by a preferred embodiment of the present invention enables the computer system to rotate the three-dimensional model such as a chart in response to a user "grabbing" a reference point on the chart and then "dragging" that reference point to a new location.

Depending on the type of three-dimensional model being viewed, certain types of rotations are undesirable. For example, when the model has a natural "up" and "down" axis (e.g., a chart, a house, a plane), rotation and certain degrees of elevation are useful for viewing, but tilt is not. For such models, the tilt should be kept at zero. A very simple way of keeping the tilt at zero is to map horizontal movement of the pointer positioning device directly to rotation, and vertical movement of the pointer positioning device directly to elevation. This produces fluid movement, but there is no kinesthetic correspondence between the pointer positioning device and the model's movement, and for certain views, the behavior is very counter intuitive. The counter intuitive behavior is not a desirable feature, rather it is important that the model is rotated as the user expects. For this reason, the rotation routine of the preferred embodiment of the present invention permits rotation about the y-axis, limited rotation about the x-axis, and zero rotation about the z-axis in a right-handed coordinate system.

Figure 1:
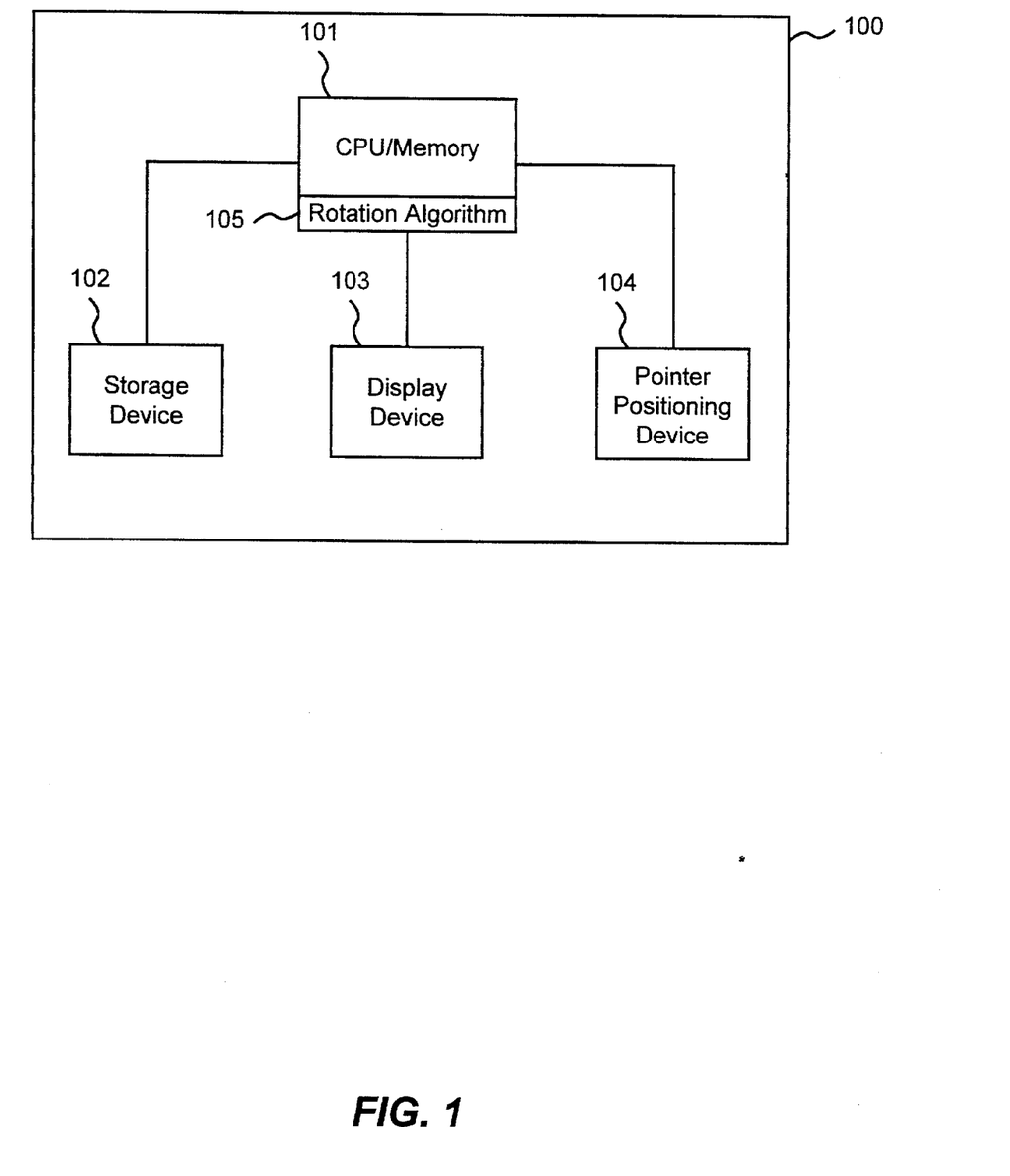
FIG. 1 is a block diagram of a preferred embodiment of a computer system configured to implement the methods of the present invention, the computer system including a display device.

FIG. 1 is a block diagram of a computer system 100 configured in accordance with a preferred embodiment of the present invention. The computer system 100 includes a central processing and memory unit 101, a storage device 102, a display device 103, and a pointer positioning device 104 with signal generating means. A rotation routine 105 is operating in the central processing and memory unit 101.

The pointer positioning device 104 can be, for example, a mouse, a trackball, a joystick, a touch screen, a touch tablet, or a digitizer. For ease of understanding, the following discussion will be in the context of a pointer positioning device 104 that is a mouse, but it should be readily appreciated by those skilled in the art that the disclosed methods can be implemented with other pointer positioning devices.

The mouse 104 controls the position of a pointer that is displayed on the display device 103. The pointer is moved by moving the mouse 104 over a flat surface in the desired direction of movement of the pointer. The two-dimensional movement of the mouse 104 on the flat surface translates in a known manner into a corresponding two-dimensional movement of the pointer on the display device 103.

The pointer positioning device 104 comprises signal generating means. When the pointer positioning device is a mouse, the signal generating means is commonly known as a mouse button. The user actuates the signal generating means by depressing the mouse button, and deactuates the signal generating means by releasing the mouse button.

Figure 2:
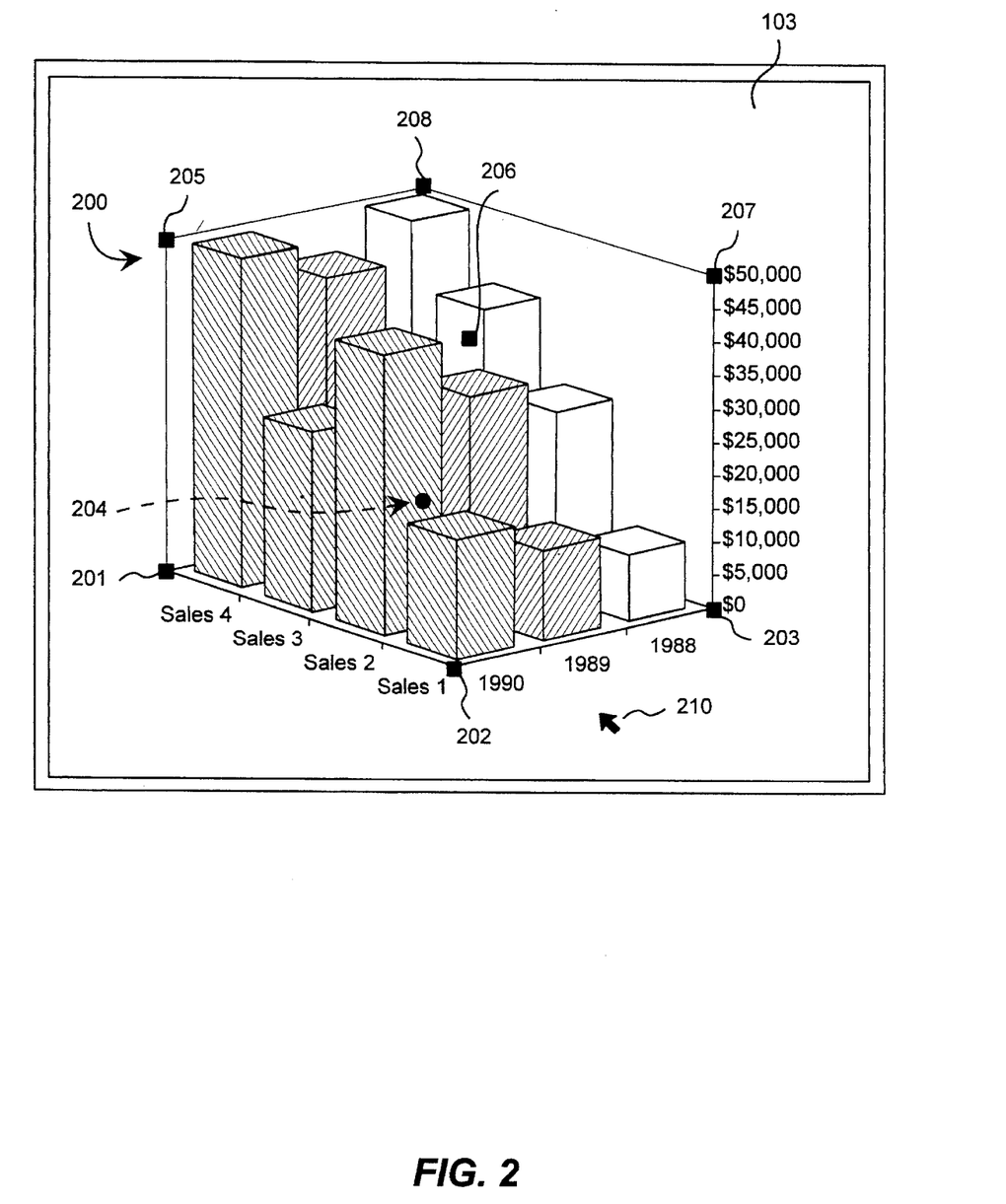
FIG. 2 is an illustration of a three-dimensional chart displayed in a right handed coordinate system on the display device of FIG. 1.

The rotation routine of the present invention enables the computer system 100 to rotate a three-dimensional model such as a chart in response to a user "grabbing" a reference point on the chart with the mouse 104, and then "dragging" that reference point to a new location. FIG. 2 is an illustration of a three-dimensional chart 200 displayed on the display device 103. The chart 200 has a chart volume which is defined by eight corner points 201, 202, 203, 204, 205, 206, 207, and 208, all of which are the same distance from the center of the chart volume. In a preferred embodiment, any of the eight corner points 201–208 of the chart volume can be used as reference points. The coordinates of each reference point before rotation are known as base coordinates. The base coordinates do not change as the model is rotated, rather the view of the model changes. The three-dimensional coordinates of the chart 200 are projected into two-dimensional coordinates in a known manner so that they can be accurately displayed on a display device, such as a display screen.

A pointer 210 is also displayed on the display device 103. A user of the computer system 100 controls the movement of the pointer 210 by moving the pointer positioning device 104.

In keeping with the desirable features of a rotation routine mentioned previously, the preferred embodiment described herein imposes restrictions on the manner in which the computer system can rotate the chart. That is, the computer system cannot rotate the chart more than ±90 degrees about the x-axis or about the z-axis at all. These restrictions are explained in more detail below.

Overview. To rotate the chart 200 displayed on the display device 103, the user first positions the pointer 210 over the reference point 201 and then depresses a predefined mouse button. The depressing of the mouse button while the pointer 210 is positioned over the reference point 201 sends a signal to the rotation routine 105 that the user desires to rotate the chart 200.

While depressing the predefined mouse button, the user repositions the pointer 210, effectively dragging the reference point 201. In a preferred embodiment, a wire-frame view of the chart 200 is displayed on the display device 103 while the computer system 100 rotates the chart 200. A full view could easily be displayed, but the computer system 100 would require more time to display the full view. The computer system 100 rotates the chart 200 to match the movement of the pointer 210. For most movements of the pointer 210, the reference point 201 on the chart remains under the pointer 210. When the user releases the predefined mouse button, a signal is sent to the rotation routine that the user desires to cease rotation of the chart 200. In response to the generation of the second signal, the computer system 100 ceases rotation and redisplays a full view of the chart 200.

Figure 3:
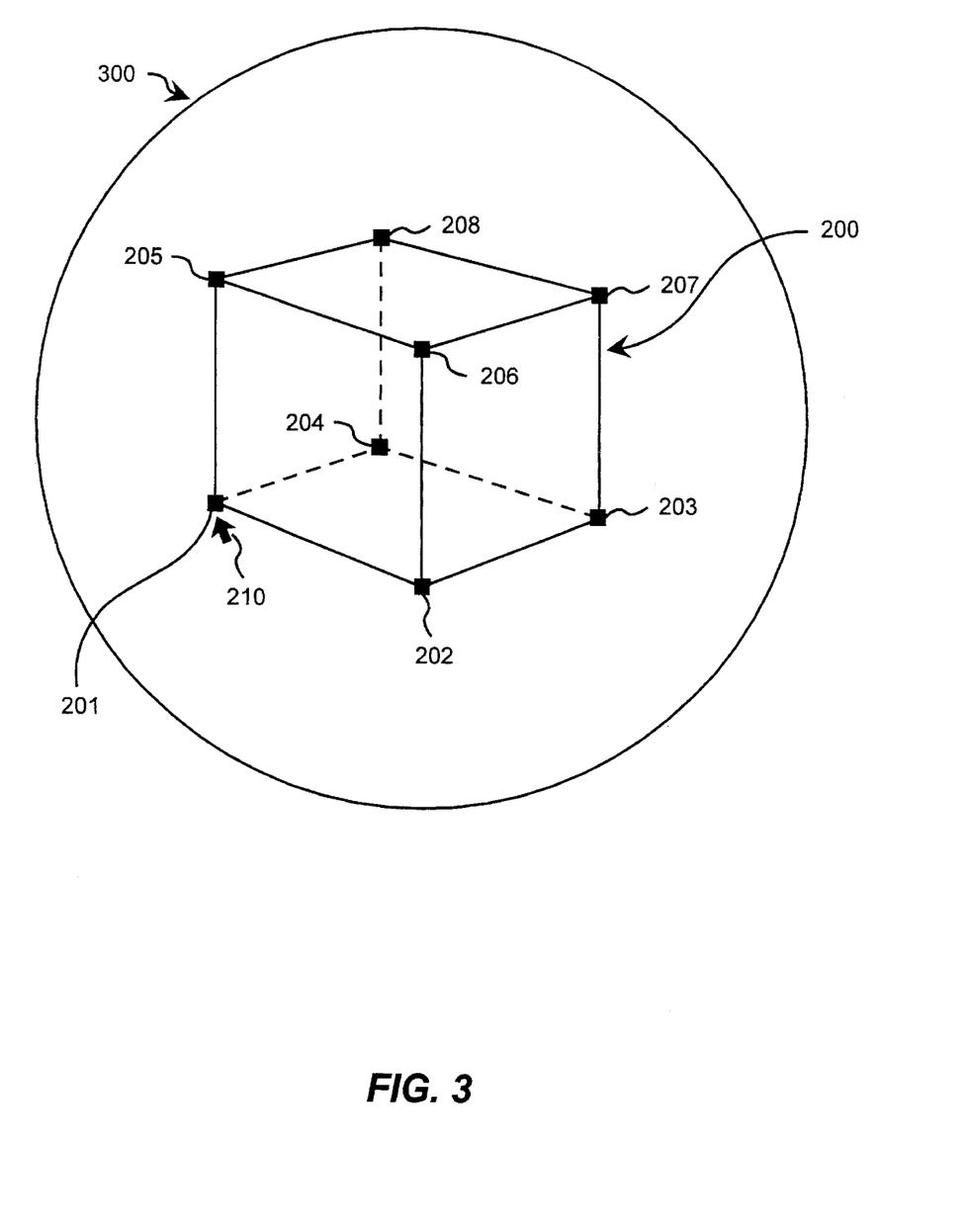
FIG. 3 is an illustration of a chart volume representation of the chart of FIG. 2 surrounded by a mathematical sphere.

The sphere. For calculation purposes, the model being rotated is secured within a mathematical sphere, so that the model is rotated as the sphere is not rotated. All rotations occur about the center of this sphere, which is the center of the model and also taken to be the origin of the coordinate system for simplicity. FIG. 3 is an illustration of a chart volume representation of the chart 200 of FIG. 2 surrounded by such a mathematical sphere 300. The reference point 201 is on the surface of the sphere 300, as are all of the reference points 201–208.

The pointer 210 is represented by two-dimensional coordinates and must be mapped (or unprojected) onto the three-dimensional sphere 300. Because the line of sight through the pointer 210 and the sphere 300 intersects the sphere 300 in two places, there are two possible sets of coordinates for the pointer 210 on the surface of the sphere 300. The rotation routine selects the pointer coordinates that are on the same side of the sphere as the previously rotated reference point. The side of the sphere on which the previously rotated point lies is referred to as the "current side of the sphere."

Reachable regions of the sphere. Because zero tilt and only certain degrees of elevation are allowed, for any reference point there are unreachable regions on the sphere to which the reference point may not be rotated. The reachable regions are those regions on the surface of the sphere that a reference point can reach by a rotation about the y-axis and/or an allowed rotation about the x-axis. For those areas of the sphere 300 that can be reached by the rotation of a point about the y-axis and/or the x-axis, the rotation routine of the present invention calculates the amount of rotation and/or elevation required.

Figure 4:
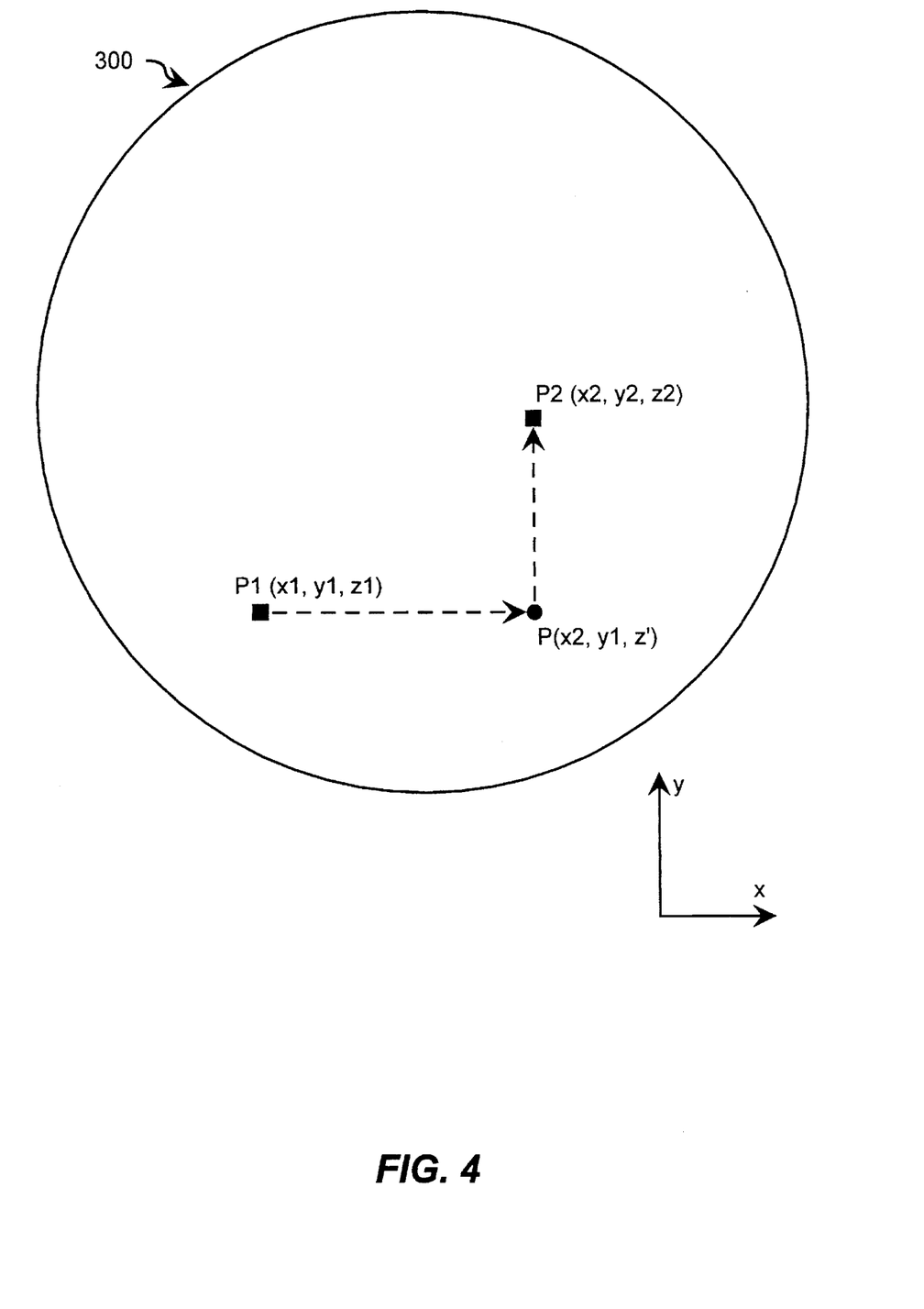
FIG. 4 illustrates a path of rotation required to move a point P1 to a point P2 on the surface of the mathematical sphere of FIG. 3.

FIG. 4 illustrates a path of rotation and elevation required to move a point P1(x1,y1,z1) to a point P2(x2,y2,z2) on the surface of the mathematical sphere of FIG. 3. The point P1 represents a grabbed reference point and the point P2 represents the unprojected mouse pointer on the current side of the sphere. The rotation does not change the y-coordinate, while the elevation does not change the x-coordinate.

To calculate the required rotations about the y-axis and the x-axis, the rotation routine first calculates the location of an intermediate point P that is reached after rotation of the point P1 about the y-axis. The y-coordinate of the point P is the same as the y-coordinate of the point P1; while the x-coordinate of the point P is the same as the x-coordinate of the point P2. The z-coordinate of the point P is calculated by solving the equation $(x2)^2+(y1)^2+(z)^2=r^2$ for z, where r is the radius of the sphere 300. Two solutions, a positive and a negative, are found for z. The point P with coordinates (x2, y1, +z) is on the near side of the sphere, while the point P with coordinates (x2, y1, −z) is on the far side of the sphere.

The rotation and elevation angles can be easily found by determining the arc's span from point P1 to the intermediate point P, and from the intermediate point P to the point P2. Because two possible intermediate points exist, two pairs of rotation and elevation angles are found for the two pairs of intermediate points. These two views are by no means equivalent, indeed, they are usually drastically different. It is important to use the same z solution, either positive or negative, so that the chart will rotate smoothly, without any abrupt jumps.

To provide for a smooth rotation with no abrupt jumps, the rotation routine tests which z solution actually produces the correct angles when a reference point is first selected and then sticks to this solution throughout the dragging. The z solution chosen by the rotation routine is referred to as the "current z solution." There are special exceptions to this rule, which are defined in more detail below in reference to special modes.

The rotation routine is wholly reliable, provided that the point P2 is in a reachable region using the current z solution. The point is in an unreachable region if no real z value will make the radius correct, or if the elevation will have to be outside of the ±90 degree range.

Unreachable regions of the sphere. Referring back to FIG. 3, if the chart 200 were free to rotate about all three orthogonal axes, the reference point 201 could be rotated to any point on the sphere 300. However, because the chart 200 may not be tilted and the chart 200 may only be elevated ±90 degrees, regions exist on the surface of the sphere 300 that are unreachable for the reference point 201. Unreachable means there are no rotations about the y-axis and/or the x-axis that will move the reference point 201 into the region.

When the pointer is not in a reachable region, it is unacceptable for the chart to simply stop rotating. Instead, the rotation routine makes a reasonable attempt to follow the mouse pointer as closely as possible. This is called tracking and is discussed in more detail below.

Figure 5A:
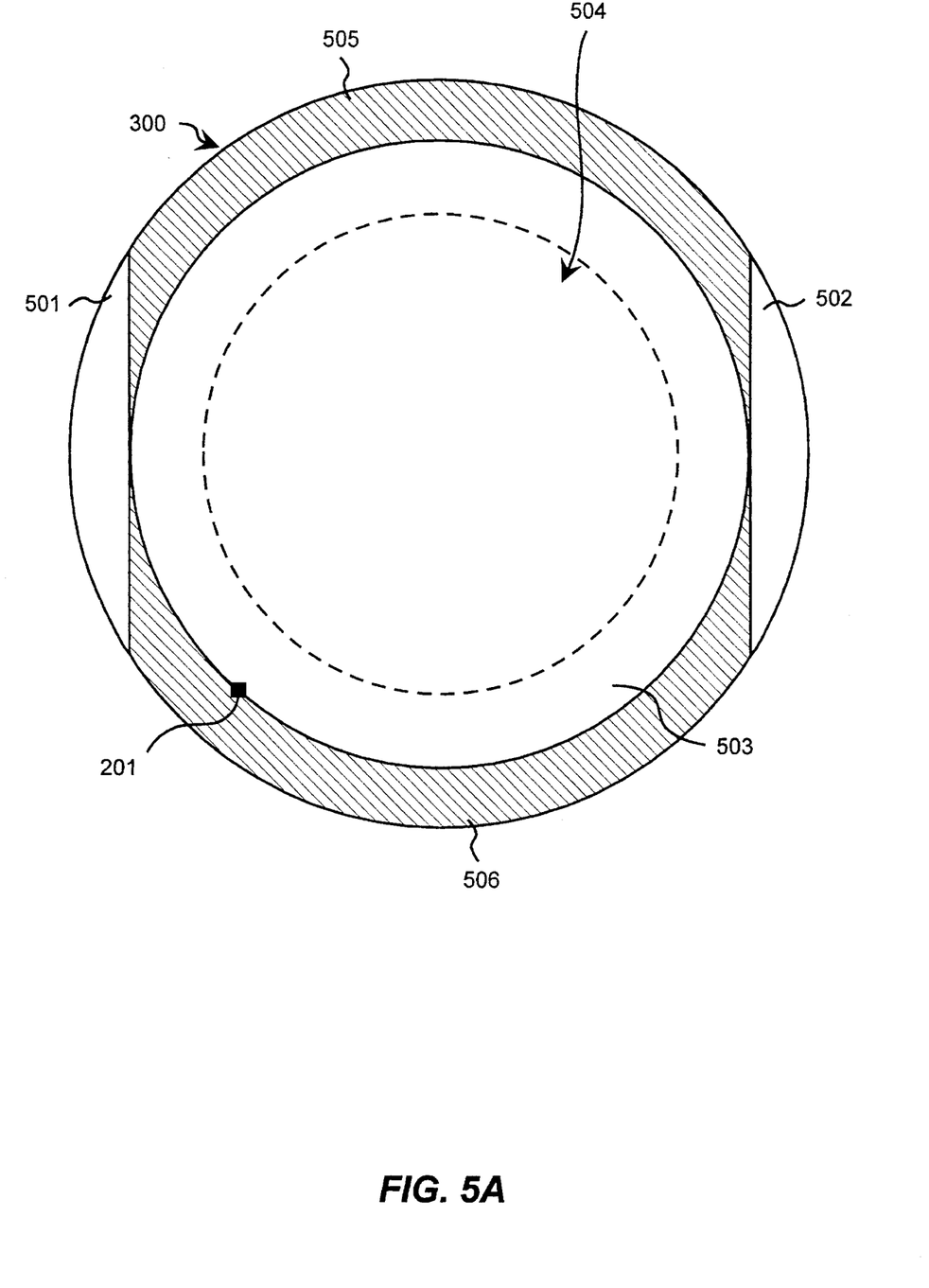
FIG. 5A is a front view illustration of the mathematical sphere of FIG. 3 sectioned into six regions.

Rotation about the y-axis only affects the x-coordinate and z-coordinate of the reference point, and in such a way that the x-z radius remains constant. Subsequent elevation changes only the y-coordinate and z-coordinate. Therefore the x-coordinate can never exceed the limit set by the initial x-z radius. This lack of rotation about the z-axis defines circular regions on the sides of the sphere 300 that are always unreachable. Referring to FIG. 5A, for the reference point 201, the unreachable side regions are a left side region 501 and a right side region 502. No rotations about the x-axis and/or the y-axis will permit the point 201 to be rotated into either of these regions 501, 502. The radius of the unreachable side regions 501, 502 is simply the initial y-coordinate of the reference point 201.

If the reference point 201 is elevated to an extreme elevation, either +90 or −90 degrees, the user is looking directly down or up on the chart 200. In this orientation, rotation will appear as tilt. The reference point 201, at this edge of allowable elevation, can trace out a circle on the front and back surfaces. These circles enclose a front region 503 and a back region 504. The back region 504 is the same size as the front region 503. The front region 503 and the back region 504 touch the side regions 501, 502 precisely on the equator of the sphere.

Either the front region 503 or the back region 504 is reachable for the reference point 201, depending on which z solution, i.e., positive z or negative z for the intermediate point, is current. Which region is reachable for the reference point 201 is determined by first attempting the rotation routine for the intermediate point on the near side of the sphere (positive z). If this intermediate point is reachable for the current solution, the front region 503 is reachable. Otherwise, the back region 504 is reachable.

Figure 5B:
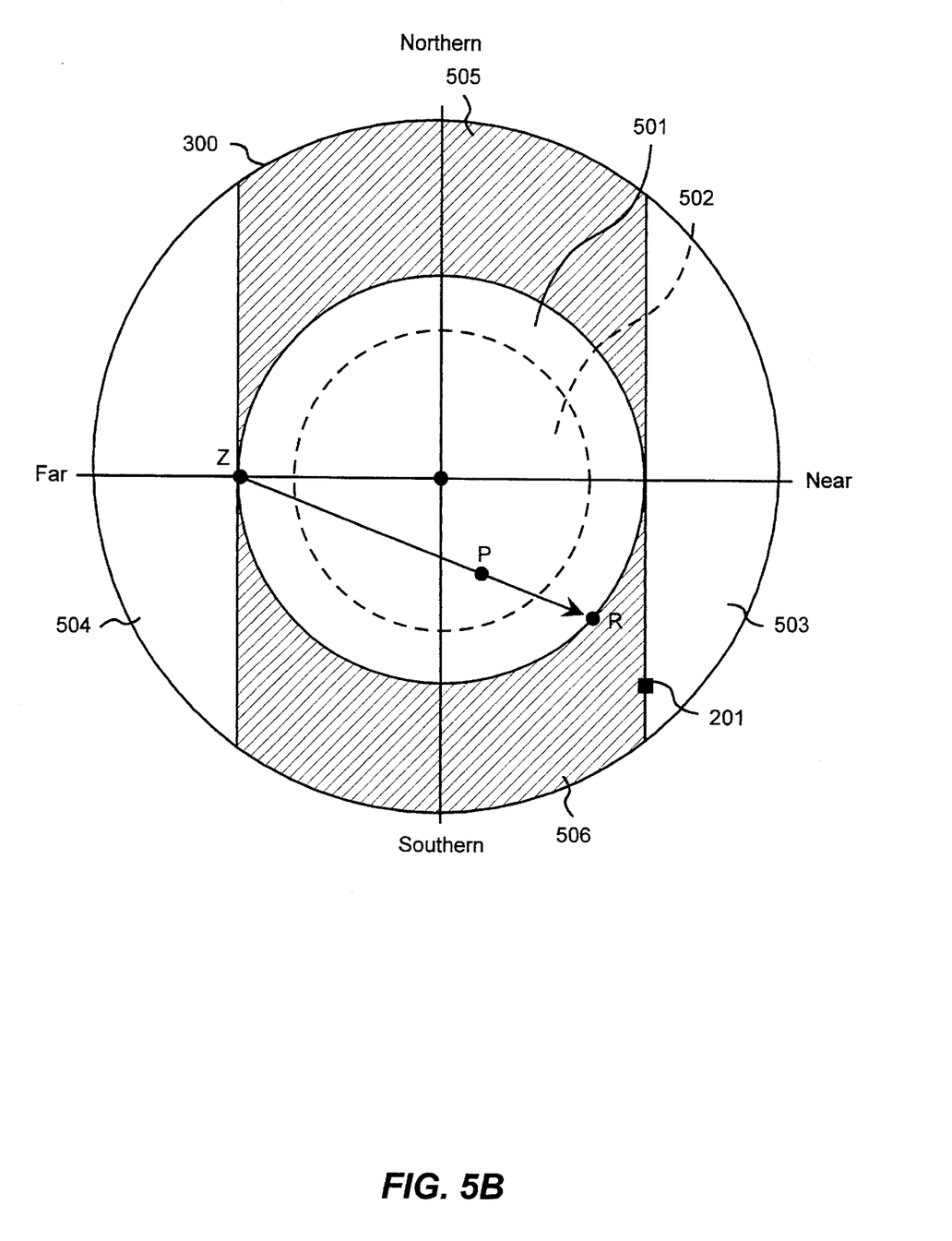
FIG. 5B is a side view illustration of FIG. 5A.

After defining the side regions 501, 502, the front region 503, and the back region 504, two cusped regions remain on the surface of the sphere. These regions are a top region 505 and a bottom region 506. Either the top region 505 or the bottom region 506 is reachable for the point 201. If the reference point 201 is on the bottom half of the sphere, i.e., if the y-coordinate of the reference point 201 is less than 0, then the bottom region 506 is reachable. Conversely, if the reference point 201 is on the top half of the sphere, then the top region 505 is reachable. FIG. 5B is a side view illustration of FIG. 5A.

The division of the sphere 300 into regions is complicated by projecting the sphere onto a two-dimensional screen with perspective. This projection distinguishes a near side and a far side, as shown in FIG. 5B. The near side is all that would be visible if the sphere were solid, and the far side is everything else.

The dividing line between the near side and the far side is a circle on the sphere at a positive (or zero) z-coordinate.

This z-coordinate is found by finding the maximum screen radius that any projected point of the sphere can have and then examining the point's original z-coordinate. This "sphere edge" cuts right through many of the other regions, and can affect the routine's behavior. The northern (positive y-coordinate) and southern (negative y-coordinate) hemispheres can also produce different tracking behavior.

Tracking the reference point from an unreachable region to a reachable region. Normally, when a user repositions the pointer 210, the view of the chart 200 is rotated so that the reference point 201 stays under the moving pointer. When the user attempts to rotate the reference point 201 into one of the unreachable regions, however, tracking routines called by the rotation routine track the reference point 201 to the pointer's movement, keeping the reference point 201 along the edge of the unreachable region in which the pointer is located.

Tracking routines attempt to find a reachable point on the sphere which is near an unreachable point on the sphere. Therefore, if the pointer is entirely off of the sphere, the pointer position is preferably radially tracked inward until it hits the precise edge of the sphere. The pointer's x, y, z intersection with the sphere is then found. This way, tracking routines such as TrackToLeftRightCircles and TrackToFrontBackCircles receive coordinates that are on the surface of the sphere as input.

TrackToFrontBackCircles tracks an unreachable point in the front region 503 or the back region 504 to a nearby point on the boundary circles of these regions. TrackToFrontBackCircles tracks the pointer by moving the unreachable pointer out radially from the center of the region until it hits the region's boundary circle.

TrackToLeftRightCircles tracks an unreachable point in the left region 501 or the right region 502 to a nearby point on the boundary circles of these regions. Looking at the left region 501 from the side (see FIG. 5B), it would be easy to use the tracking method of TrackToFrontBackCircles, but this method can easily track to a point on the opposite side (i.e., near side or far side) of the sphere, which produces awful behavior.

The preferred method of tracking used by TrackToLeftRightCircles for the side regions 501, 502, tracks the unreachable point out radially from the most extreme z-coordinate of the left/right circle on the side of the circle that is on the opposite sphere side (near/far) from the unreachable point. Referring to FIG. 5B, for example, if the user attempted to move reference point 201 to point P in side region 501, TrackToLeftRightCircles would rotate reference point 201 to point R. The point Z is the most extreme z-coordinate on the far side of the boundary circle of the left region. The method used by TrackToLeftRightCircles ensures that the track point is on the correct sphere side while avoiding abrupt jumps in view associated with moving near the center of the sphere.

The use of the two subroutines TrackToLeftRightCircles and TrackToFrontBackCircles is controlled in a very complex manner. For the following discussion, assume for the reference point 201 that the bottom region 506 is reachable, rather than the top region 505. If the pointer is in the unreachable front/back region 504 and is on the southern hemisphere, use TrackToFrontBackCircles to get a reachable point. If the pointer is in the unreachable left region 501 or the unreachable right region 502, and is on the southern hemisphere, TrackToLeftRightCircles is used to get a reachable point.

If the pointer is on the northern hemisphere of the sphere (which is mostly unreachable), tracking becomes more complicated. If the pointer is in one of the side regions 501, 502, or in the top region 505, the rotation routine uses TrackToFrontBackCircles to track to the reachable front/back region 503, but only if the reachable front/back region is on the correct sphere side.

If the reachable front/back region is on the wrong sphere side, the rotation routine enters "special mode 1." This mode temporarily flips the z solution, making the front/back region on the correct side reachable. This does not produce an abrupt jump because the reference point must have moved along the edge of the left or right region just before, where the z solution can be flipped without changing views. If the pointer moves into this newly reachable region, the z solution flip becomes permanent. Otherwise, the temporary z solution flip is undone when the pointer returns to the southern hemisphere.

If the pointer is in the unreachable front/back region in the northern hemisphere, the rotation routine enters "special mode 2." This mode also flips the z solution, so that the pointer is in the middle of a reachable region. However, the view produced by this z solution flip might be an abrupt jump from the last view. Instead, TrackToFrontBackCircles is still used to track the pointer, despite the fact that the pointer is actually reachable. This mode produces a nice spinning effect for a top view if the reference point is pulled into the unreachable back region and is looped around the center.

Like the other special modes, the z solution flip is undone if the pointer moves back into the southern hemisphere. However, if the pointer is moved to its tracked position, the z solution flip becomes permanent because it now involves no abrupt changes of view.

It is important to note that if the user keeps moving the reference point to reachable regions of the sphere, none of the special modes or tracking routines are used.

For isometric projections, the rotation routine is vastly simpler. The reachable region turns out to be a small square. If the pointer is moved outside of this square, a modified rotation routine traces the pointer radially in toward the center of the square until the trace hits the edge of the square.

Figure 6:
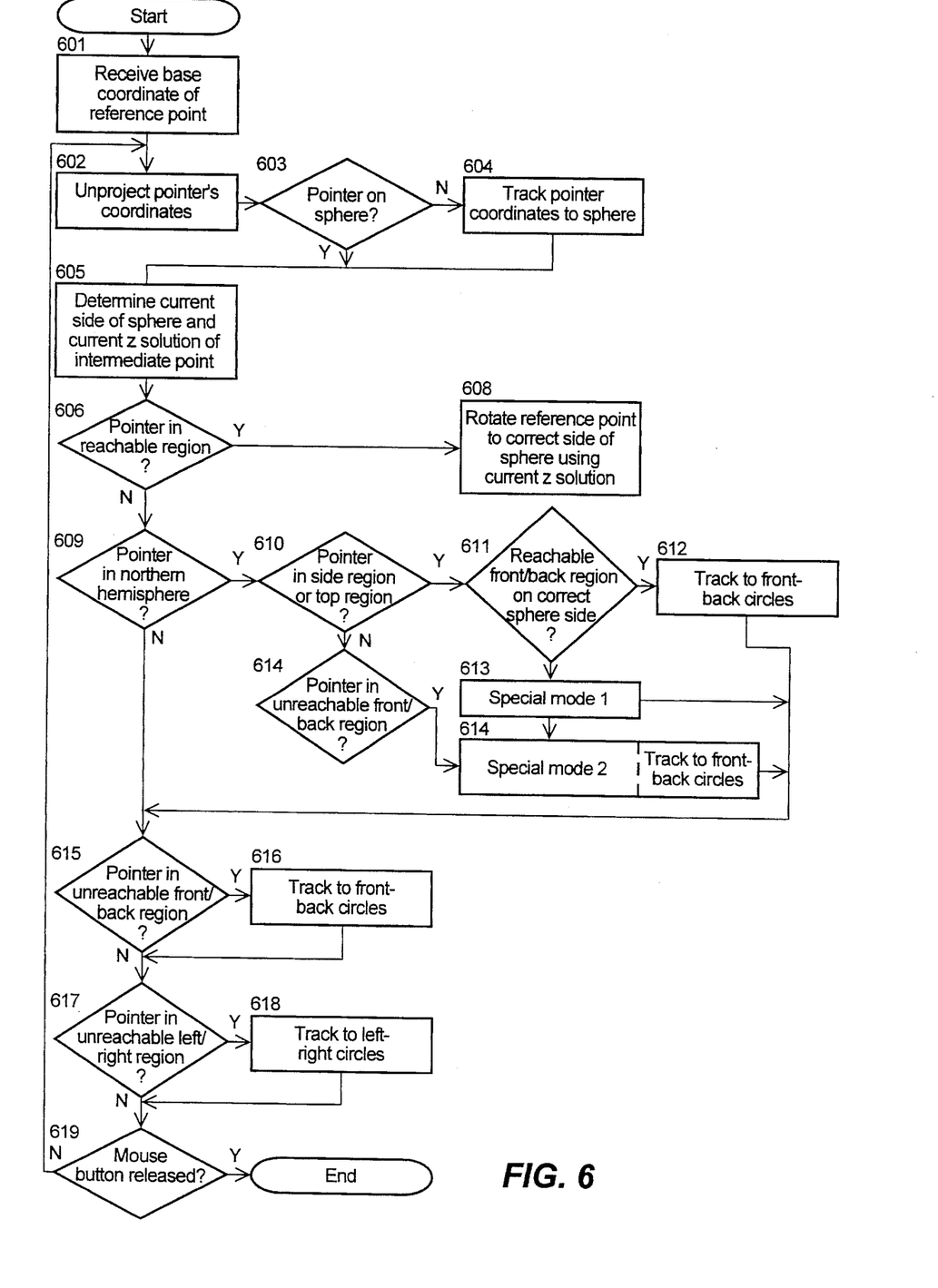
FIG. 6 is an overview flow diagram of a method used in a preferred embodiment of the present invention to rotate a three-dimensional chart.

FIG. 6 is an overview flow diagram of the method used in a preferred embodiment of the present invention to rotate the three-dimensional chart of FIG. 2. The user activates the rotation routine by positioning the pointer over one of the eight reference points 201–208 and depressing a predefined mouse button.

In step 601 the rotation routine receives the base coordinates of the reference point. These base coordinates remain the same throughout the rotation. The base coordinates are always used to determine whether a region is reachable or unreachable for the reference point. In step 602 the rotation routine unprojects the pointer's coordinates into three dimensions. As mentioned above, the line of sight through the pointer will intersect the sphere in two places. In step 603 the rotation routine determines whether the pointer even is pointing to the sphere. If the pointer is not pointing to the sphere, then in step 604 the rotation routine tracks the pointer's coordinates to the sphere as described above. If the pointer is pointing to the sphere, then in step 605 the rotation routine determines the correct side of the sphere on which the pointer should lie and the current z solution. This determination is based on previous rotations.

In step 606 the rotation routine determines whether the pointer is in a reachable region. If the pointer is in a reachable region, then in step 608 the rotation routine causes the reference point to be rotated to the correct side of the sphere using the current z solution.

If in step 606 the rotation routine determines that the pointer is in an unreachable region, then in step 609 the rotation routine determines whether the pointer is in the northern hemisphere of the sphere. If the pointer is within the northern hemisphere, then in step 610 the rotation routine determines whether the pointer is in either the left side region, the right side region, or the top region. If the pointer is within the left side region, the right side region, or the top region, then in step 611 the rotation routine determines whether the reachable front/back region is on the correct sphere side. If the reachable front/back region is on the correct sphere side, then in step 612 the rotation routine uses TrackToFrontBackCircles to track the pointer as described above. If the reachable front/back region is not on the correct side of the sphere, then in step 613 the rotation routine uses special mode 1 to track the pointer. Special mode 1 is described above.

If in step 610 the rotation routine determines that the pointer is not in the left side region, the right side region, or in the top region, in step 614 the rotation routine determines whether the pointer is in an unreachable front/back region. If the pointer is in the unreachable front/back region, then in step 614 the rotation routine uses special mode 2 to track the pointer. Special mode 2 is described above.

If in step 609 the rotation routine determines that the pointer is in the southern hemisphere, then in step 615 the rotation routine determines whether the pointer is in an unreachable front/back region. If the pointer is in an unreachable front/back region, then in step 616 the rotation routine uses TrackToFrontBackCircles to track the pointer. This routine is described above. If the pointer is in a reachable front/back region, then in step 617 the rotation routine determines whether the pointer is in an unreachable left/right region. If the pointer is in an unreachable left/right region, then the rotation routine uses TrackToLeftRightCircles to track the pointer movement.

The preferred embodiment of the present invention described herein combines many features desirable for viewing charts. The first of these features is that only rotation and certain degrees of elevation of the chart are allowed so that the chart maintains its proper "up" and "down" positioning. Second, a user of the computer system can grab a reference point on the chart with the mouse and drag the reference point to a new position. The computer system rotates the chart to keep a kinesthetic correspondence between the reference point and the pointer. By keeping the reference point under the pointer, the computer system provides a third desirable feature—reversibility—which restores the original view when the user returns the pointer back to its original position.

The computer system also provides real time rotation of the model so that the user has instant feedback about what view is being displayed. The rotation routine of the present invention provides for effortless, rapid, and intuitive rotation of three-dimensional models with a mouse or other pointer positioning device. Methods and systems designed in accordance with the present invention are much easier to use than prior art methods and represent a significant advancement of the art.

Although the methods and systems of the present invention have been described in terms of a preferred embodiment, it is not intended that the invention be limited to this embodiment. Modifications within the spirit of the invention will be apparent to those skilled in the art. The scope of the present invention is defined only by the claims that follow.

We claim:

1. A method in a computer system for rotating an object displayed on a display device, wherein the computer system includes a pointer positioning device for positioning a pointer displayed on the display device, the method comprising:

providing a reference sphere having a surface which intersects a reference point on the object, wherein the surface has opposing near and far partial-spheres, wherein the surface includes at least one reachable region and opposing left and right unreachable regions each having a boundary, the regions being defined by constraints on rotation of the object;

selecting the reference point on the object with the pointer positioning device;

detecting movement of the pointer positioning device which moves the pointer and indicates a rotation of the object;

determining an intersection point between the pointer and the surface of the reference sphere;

determining an amount of rotation for the object which corresponds to the indicated rotation of the object, wherein when the intersection point is in the left or right unreachable region the amount of rotation is determined such that the selected reference point coincides with a tracked point which lies along the boundary of the left or right unreachable region, respectively, in the same near or far partial-sphere as the intersection point; and rotating the object by the determined amount of rotation.

2. The method of claim 1 wherein the object has an opposing front and back and an opposing top and bottom, wherein the amount of rotation is determined such that rotation of the object about the x-axis in a right-handed coordinate system is limited to a pitch of ±90 degrees.

3. The method of claim 1 wherein determining the intersection point comprises:

calculating a first point and a second point on the surface of the reference sphere such that the pointer, the first point, and the second point are aligned along a line, the first point lying on the near partial-sphere, the second point lying on the far partial sphere;

when the selected reference point is in the near partial-sphere before the object is rotated by the determined amount of rotation, selecting the first point as the intersection point; and when the selected reference point is in the far partial-sphere before the object is rotated by the determined amount of rotation, selecting the second point as the intersection point.

4. The method of claim 1 wherein an intermediate point is a point that has the same x coordinate value as the intersection point when the intersection point is in a reachable region and as the tracked point when the intersection point is in an unreachable region and that has the same y coordinate value as the reference point and wherein determining the amount of rotation for the object includes:

calculating an amount of rotation about a y-axis in a right-handed coordinate system which will rotate the object so that the selected reference point is coincident with the intermediate point, wherein the intermediate point has a z-coordinate which is positive when the z-coordinate of the selected reference point is positive before the object is rotated by the determined amount of rotation and which is negative when the z-coordinate of the selected reference point is negative before the object is rotated by the determined amount of rotation; and calculating an amount of rotation about an x-axis in the right-handed coordinate system which will rotate the object so that the selected reference point is coincident with the tracked point when the intersection point is in the left or right unreachable region and otherwise will rotate the object so that the selected reference point is coincident with the intersection point when the intersection point is in a reachable region.

5. The method of claim 1 wherein the object has an opposing front and back and an opposing top and bottom, wherein the reference point has base coordinates when the object is in an upright orientation in which its rotation about the x and z-axes in a right-handed coordinate system is a zero-degree pitch and roll, the object being constrained to rotate only ±90 about the x axis and to no rotation about the z axis, wherein the surface of the reference sphere has opposing top and bottom hemispheres, wherein the near and far partial-spheres have opposing front and back regions, respectively, each having a center point, wherein the near and far partial-spheres have opposing front and back reachable perimeter regions which are defined by rotating the object either ±90 degrees about the x axis and rotating the object 360 degrees about its y axis, respectively, wherein the top and bottom hemispheres have opposing top and bottom regions, respectively, the top and bottom regions being that portion of the top or bottom hemisphere, respectively, except for the left and right unreachable region and the front and back regions, wherein determining the amount of rotation for the object comprises:

when the z-coordinate of the selected reference point is positive before the object is rotated by the determined amount of rotation, determining the front region to be reachable and the back region to be unreachable;

when the z-coordinate of the selected reference point is negative or zero before the object is rotated by the determined amount of rotation, determining the back region to be reachable and the front region to be unreachable;

when the base coordinates of the selected reference point are in the top hemisphere, determining the top region to be reachable and the bottom region to be unreachable;

when the base coordinates of the selected reference point are in the bottom hemisphere, determining the top region to be unreachable and the bottom region to be reachable; and when the intersection point is in the unreachable front or back region and is in the same top or bottom hemisphere as the reachable top or bottom region, determining the amount of rotation such that the selected reference point coincides with a tracked point in the front or back reachable perimeter region associated with the unreachable front or back region, wherein the tracked point intersects a ray from the center point of the unreachable front or back region through the intersection point.

6. The method of claim 1 wherein the object has an opposing front and back and an opposing top and bottom, wherein the selected reference point has base coordinates when the object is in an upright orientation in which its rotation about the x and z-axes in a right-handed coordinate system is a zero-degree pitch and roll, the object being constrained to rotate only ±90 about the x axis and no rotation about the z axis, wherein the surface of the reference sphere has opposing top and bottom hemispheres, wherein the near and far partial-spheres have opposing front and back regions, respectively, each having a center point, wherein the near and far partial-spheres have opposing front and back reachable perimeter regions, which are defined by tilting the object either ±90 degrees about the x axis and rotating the object 360 degrees about its y axis, respectively, wherein the top and bottom hemispheres have opposing top and bottom regions, respectively, the top and bottom regions being that portion of the top or bottom hemisphere, respectively, except for the left and right unreachable region and the front and back regions, wherein determining the amount of rotation for the object comprises:

when the z-coordinate of the selected reference point is positive before the object is rotated by the determined amount of rotation, determining the front region to be reachable and the back region to be unreachable;

when the z-coordinate of the selected reference point is negative before the object is rotated by the determined amount of rotation, determining the back region to be reachable and the front region to be unreachable;

when the base coordinates of the selected reference point are in the top hemisphere, determining the top region to be reachable and the bottom region to be unreachable;

when the base coordinates of the selected reference point are in the bottom hemisphere, determining the bottom region to be reachable and the top region to be unreachable; and when the intersection point is in the same partial-sphere as the front or back reachable region and is in the left, right, or top or bottom unreachable region and is in the same top or bottom hemisphere as the unreachable top or bottom region, determining the amount of rotation such that the selected reference point coincides with a tracked point in the front or back reachable perimeter region associated with the reachable front or back region, wherein the tracked point intersects a ray from the center point of the reachable front or back region through the intersection point.

7. The method of claim 1 wherein the tracked point intersects a ray from an extreme point on the boundary of the respective left or right unreachable region through the intersection point, wherein the extreme point is in the near partial-sphere when the selected reference point is in the far partial-sphere before the object is rotated by the determined amount of rotation, wherein the extreme point is in the far partial-sphere when the selected reference point is in the near partial-sphere before the object is rotated by the determined amount of rotation.

8. A computer system for rotating an object displayed on a display device, the computer system comprising:

a pointer positioning device for positioning a pointer displayed on the display device;

means for providing a reference sphere having a surface which intersects a reference point on the object, wherein the surface has opposing near and far partial-spheres, wherein the surface includes at least one reachable region and opposing left and right unreachable regions each having a boundary, the regions being defined by constraints on rotation of the object;

means for selecting the reference point on the object in response to a selection signal from the pointer positioning device;

means for detecting movement of the pointer positioning device to move the pointer and to indicate a rotation of the object;

means for determining an intersection point between the pointer and the surface of the reference sphere;

means for determining an amount of rotation for the object which corresponds to the indicated rotation of the object, wherein when the intersection point is in the left or right unreachable region the amount of rotation is determined such that the selected reference point coincides with a tracked point which lies along the boundary of the left or right unreachable region, respectively, in the same near or far partial-sphere as the intersection point; and means for rotating the object by the determined amount of rotation.

9. The computer system of claim 8 wherein the object has an opposing front and back and an opposing top and bottom, wherein the determining means determines the amount of rotation such that rotation of the object about the x-axis in a right-handed coordinate system is limited to a pitch of ±90 degrees.

10. The computer system of claim 8 wherein the means for determining the intersection point comprises:

means for calculating a first point and a second point on the surface of the reference sphere such that the pointer, the first point, and the second point are aligned along a line, the first point lying on the near partial-sphere; and means for selecting the first point as the intersection point when the selected reference point is in the near partial-sphere before the object is rotated by the determined amount of rotation and for selecting the second point as the intersection point when the selected reference point is in the far partial-sphere before the object is rotated by the determined amount of rotation.

11. The computer system of claim 8 wherein the means for determining an amount of rotation for the object includes:

means for calculating an amount of rotation about a y-axis in a right-handed coordinate system which will rotate the object so that the selected reference point is coincident with an intermediate point, wherein the intermediate point has a z-coordinate which is positive when the z-coordinate of the selected reference point is positive before the object is rotated by the determined amount of rotation and which is negative when the z-coordinate of the selected reference point is negative before the object is rotated by the determined amount of rotation; and means for calculating an amount of rotation about an x-axis in the right-handed coordinate system which will rotate the object so that the selected reference point is coincident with the tracked point when the intersection point is in the left or right unreachable region and otherwise will rotate the object so that the selected reference point is coincident with the intersection point when the intersection point is in a reachable region.

12. The computer system of claim 9 wherein the object has an opposing front and back and an opposing top and bottom, wherein the selected reference point has base coordinates when the object is in an upright orientation in which its rotation about the x and z-axes in a right-handed coordinate system is a zero-degree pitch and roll, wherein the surface of the reference sphere has opposing top and bottom hemispheres, wherein the near and far partial-spheres have opposing front and back regions, respectively, each having a center point, wherein the near and far partial-spheres have opposing front and back reachable perimeter regions, respectively, wherein the top and bottom hemispheres have opposing top and bottom regions, respectively, wherein the means for determining the amount of rotation for the object comprises:

means for determining the front region to be reachable and the back region to be unreachable when the z-coordinate of the selected reference point is positive before the object is rotated by the determined amount of rotation and for determining the back region to be reachable and the front region to be unreachable when the z-coordinate of the selected reference point is negative before the object is rotated by the determined amount of rotation;

means for determining the top region to be reachable and the bottom region to be unreachable when the base coordinates of the selected reference point are in the top hemisphere and for determining the top region to be unreachable and the bottom region to be reachable when the base coordinates of the selected reference point are in the bottom hemisphere; and means for determining the amount of rotation such that the selected reference point is coincident with a tracked point in the front or back reachable perimeter region associated with the unreachable front or back region when the intersection point is in the unreachable front or back region and is in the same top or bottom hemisphere as the reachable top or bottom region, wherein the tracked point intersects a ray in an xy plane from the center point of the unreachable front or back region through a point having the same x and y coordinates as the intersection point.

13. The computer system of claim 8 wherein the object has an opposing front and back and an opposing top and bottom, wherein the selected reference point has base coordinates when the object is in an upright orientation in which its rotation about the x and z-axes in a right-handed coordinate system is a zero-degree pitch and roll, wherein the surface of the reference sphere has opposing top and bottom hemispheres, wherein the near and far partial-spheres have opposing front and back regions, respectively, each having a center point, wherein the near and far partial-spheres have opposing front and back reachable perimeter regions, respectively, wherein the top and bottom hemispheres have opposing top and bottom regions, respectively, wherein the means for determining the amount of rotation for the object comprises:

means for determining the front region to be reachable and the back region to be unreachable when the z-coordinate of the selected reference point is positive before the object is rotated by the determined amount of rotation and for determining the back region to be reachable and the front region to be unreachable when the z-coordinate of the selected reference point is negative before the object is rotated by the determined amount of rotation;

means for determining the top region to be reachable and the bottom region to be unreachable when the base coordinates of the selected reference point are in the top hemisphere and for determining the top region to be unreachable and the bottom region to be reachable when the base coordinates of the selected reference point are in the bottom hemisphere; and means for determining the amount of rotation such that the selected reference point is coincident with a tracked point in the front or back reachable perimeter region associated with the reachable front or back region when the intersection point is in the same partial-sphere as the front or back reachable region and is in the left, right, or top or bottom unreachable region and is in the same top or bottom hemisphere as the unreachable top or bottom region, wherein the tracked point intersects a ray in an xy plane from the center point of the reachable front or back region through a point having the same x and y coordinates as the intersection point.

14. The computer system of claim 8 wherein the tracked point intersects a ray in a yz plane from an extreme point on the boundary of the respective left or right unreachable region through a point having the same y and z coordinates in a right-handed coordinate system as the intersection point, wherein the extreme point is in the near partial-sphere when the selected reference point is in the far partial-sphere before the object is rotated by the determined amount of rotation, wherein the extreme point is in the far partial-sphere when the selected reference point is in the near partial-sphere before the object is rotated by the determined amount of rotation.

15. A method in a computer system for rotating an object displayed on a display device, the object being constrained to a certain degree of rotation, wherein the computer system includes a pointer positioning device for positioning a pointer displayed on the display device, the method comprising:

providing a reference sphere having a surface which intersects a reference point on the object, wherein the surface has a reachable region and an unreachable region that are defined by the constraint;

selecting the reference point on the object with the pointer positioning device;

detecting movement of the pointer positioning device which moves the pointer and indicates a rotation of the object;

determining an intersection point between the pointer and the surface of the reference sphere;

determining an amount of rotation for the object which corresponds to the indicated rotation of the object, such that when the intersection point is in an unreachable region the amount of rotation is determined so that the selected reference point coincides with a tracked point in a reachable region and such that when the intersection point is in a reachable region, the amount of rotation is determined so that the selected reference point coincides with the intersection point; and rotating the object by the determined amount of rotation.

16. The method of claim 15 wherein the object is constrained in its rotation about the x and z axes, wherein the reference point has base coordinates when the object is in an upright orientation in which its rotation about the x and z-axes is a zero-degree pitch and roll, wherein the surface of the reference sphere has opposing top and bottom hemispheres and opposing near and far partial-spheres, wherein the near and far partial-spheres have opposing front and back regions, respectively, each having a center point, wherein the near and far partial-spheres have opposing front and back reachable perimeter regions, respectively, the front and back reachable perimeter regions are formed by constraints on the rotation of the object, wherein the top and bottom hemispheres have opposing top and bottom regions, respectively, wherein the surface has opposing left and right unreachable regions, the top and bottom regions being that portion of the top and bottom hemispheres, respectively, except for the front and back regions and the left and right unreachable regions, wherein the tracked point is determined to be in the front or back reachable perimeter region associated with the unreachable region the intersection point is in and is determined to intersect a ray in an xy plane from the center point of the associated unreachable region through a point having the same x and y coordinates as the intersection point, wherein the method further comprises:

when the z-coordinate of the selected reference point is positive before the object is rotated by the determined amount of rotation, determining the front region to be reachable and the back region to be unreachable;

when the z-coordinate of the selected reference point is negative before the object is rotated by the determined amount of rotation, determining the back region to be reachable and the front region to be unreachable;

when the base coordinates of the selected reference point are in the top hemisphere, determining the top region to be reachable and the bottom region to be unreachable; and when the base coordinates of the selected reference point are in the bottom hemisphere, determining the top region to be unreachable and the bottom region to be reachable, wherein when the intersection point is in the unreachable front or back region and the intersection point is in the same top or bottom hemisphere as the unreachable top or bottom region rotating the object such that the selected reference point is coincident with the intersection point.

17. The method of claim 16 wherein determining the intersection point comprises:

calculating a first point and a second point on the surface of the reference sphere such that the pointer, the first point, and the second point are aligned along a line, the first point lying on the near partial-sphere, the second point lying on the far partial sphere;

when the selected reference point is in the near partial-sphere before the object is rotated by the determined amount of rotation, selecting the first point as the intersection point; and when the selected reference point is in the far partial-sphere before the object is rotated by the determined amount of rotation, selecting the second point as the intersection point.

18. The method of claim 15 wherein determining the amount of rotation for the object includes:

calculating an amount of rotation about the y-axis which will rotate the object so that the selected reference point is coincident with an intermediate point, wherein the intermediate point has a z-coordinate which is positive when the z-coordinate of the selected reference point is positive before the object is rotated by the determined amount of rotation and which is negative when the z-coordinate of the selected reference point is negative before the object is rotated by the determined amount of rotation; and calculating an amount of rotation about the x-axis which will rotate the object so that the selected reference point is coincident with the tracked point when the intersection point is in an unreachable region and otherwise will rotate the object so that the selected reference point is coincident with the intersection point when the intersection point is in a reachable region.

19. The method of claim 15 wherein rotation of the object about the x-axis is limited to a pitch of ±90 degrees.

20. The method of claim 15 wherein the object is constrained in its rotation about the x and z axes, wherein the reference point has base coordinates when the object is in an upright orientation in which its rotation about the x and z-axes is a zero-degree pitch and roll, wherein the surface of the reference sphere has opposing top and bottom hemispheres and opposing near and far partial-spheres, wherein the near and far partial-spheres have opposing front and back regions, respectively, each having a center point, wherein the near and far partial-spheres have opposing front and back reachable perimeter regions, respectively, the front and back reachable perimeter regions are formed by constraints on the rotation of the object, wherein the top and bottom hemispheres have opposing top and bottom regions, respectively, wherein the surface has opposing left and right unreachable regions, the top and bottom regions being that portion of the top and bottom hemispheres, respectively, except for the front and back regions and the left and right unreachable regions, wherein the tracked point is determined to be in the front or back reachable perimeter region associated with the unreachable region the intersection point is in and is determined to intersect a ray in an xy plane from the center point of the associated unreachable region through a point having the same x and y coordinates as the intersection point, wherein the method further comprises:

- when the z-coordinate of the selected reference point is positive before the object is rotated by the determined amount of rotation, determining the front region to be reachable and the back region to be unreachable;
- when the z-coordinate of the selected reference point is negative before the object is rotated by the determined amount of rotation, determining the back region to be reachable and the front region to be unreachable;
- when the base coordinates of the selected reference point are in the top hemisphere, determining the top region to be reachable and the bottom region to be unreachable; and
- when the base coordinates of the selected reference point are in the bottom hemisphere, determining the top region to be unreachable and the bottom region to be reachable, wherein when the intersection point is in the same partial-sphere as the front or back unreachable region and is in the left, right, or top or bottom unreachable region and is in the same top or bottom hemisphere as the unreachable top or bottom region rotating the object such that the selected reference point is coincident with the intersection point.

21. The method of claim 20 wherein determining the intersection point comprises:

- calculating a first point and a second point on the surface of the reference sphere such that the pointer, the first point, and the second point are aligned along a line, the first point lying on the near partial-sphere;
- when the selected reference point is in the near partial-sphere before the object is rotated by the determined amount of rotation, selecting the first point as the intersection point; and
- when the selected reference point is in the far partial-sphere before the object is rotated by the determined amount of rotation, selecting the second point as the intersection point.

* * * * *

UNITED STATES PATENT AND TRADEMARK OFFICE
CERTIFICATE OF CORRECTION

PATENT NO. : 5,557,714
DATED : September 17, 1996
INVENTOR(S) : Andrew Lines, et. al.

It is certified that error appears in the above-indentified patent and that said Letters Patent is hereby corrected as shown below:

In column 13, claim 12, line 53, please delete "9" and insert therefor --8--.

Signed and Sealed this

Eleventh Day of February, 1997

Attest:

BRUCE LEHMAN

*Attesting Officer*     *Commissioner of Patents and Trademarks*